United States Patent
Schwenger et al.

(10) Patent No.: US 7,159,399 B2
(45) Date of Patent: Jan. 9, 2007

(54) DEVICE FOR RENDERING OPERATIONAL A HYDRAULIC ACTUATING DEVICE

(75) Inventors: Andreas Schwenger, Wolfsburg/Reislingen (DE); Otto Ebner, Friedrichshafen (DE); Klaus Schweiger, Friedrichshafen (DE); Christoph Rüchardt, Bodolz (DE); Marcus Gansohr, Salem (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 19 days.

(21) Appl. No.: 10/531,693

(22) PCT Filed: Nov. 8, 2003

(86) PCT No.: PCT/EP03/12479

§ 371 (c)(1),
(2), (4) Date: Apr. 18, 2005

(87) PCT Pub. No.: WO2004/046573

PCT Pub. Date: Jun. 3, 2004

(65) Prior Publication Data

US 2005/0279087 A1    Dec. 22, 2005

(30) Foreign Application Priority Data

Nov. 16, 2002  (DE) ................ 102 53 492

(51) Int. Cl.
*F15B 7/10*  (2006.01)
(52) U.S. Cl. ........................................ 60/584
(58) Field of Classification Search .......... 60/584, 60/592; 91/444, 448; 188/352
See application file for complete search history.

(56) References Cited

U.S. PATENT DOCUMENTS

| 3,812,942 A | 5/1974 | Espenschied et al. |
| 5,009,299 A | 4/1991 | Seegers |
| 2004/0065081 A1 | 4/2004 | Bruck |

FOREIGN PATENT DOCUMENTS

| DE | 2 129 292 | 4/1973 |
| DE | 39 07 341 A1 | 9/1990 |
| DE | 199 53 093 A1 | 6/2001 |
| DE | 101 02 409 A1 | 7/2002 |
| EP | 0 984 185 A2 | 3/2000 |

*Primary Examiner*—Michael Leslie
(74) *Attorney, Agent, or Firm*—Davis & Bujold, P.L.L.C.

(57) ABSTRACT

A device for rendering a hydraulic actuating device operational. A motor vehicle clutch with an emitter-receiver system located in the transmission path of the actuating device comprising two pistons whose positions, relative to one another, can vary as a function of the desired operating behavior of the actuating device and is developed further such that in relation to the emitter-receiver system that is to be filled with fluid, operationality can be established comparatively quickly and by simple way. A fluid supply unit (24) comprises one impulse valve (25) that serves to release an essentially constant volume flow, acted upon by an impulse valve control device (26) which is constructed such that the fluid volume flow released by the fluid supply unit (24) and flowing into the emitter-receiver system (5) does not exceed a limiting volume flow $Q_K$.

6 Claims, 3 Drawing Sheets

DEVICE FOR RENDERING OPERATIONAL A HYDRAULIC ACTUATING DEVICE

This application is a national stage completion of PCT/EP2003/012479 filed Nov. 8, 2003 which claims priority from German Application Ser. No. 102 53 492.6 filed Nov. 16, 2002.

FIELD OF THE INVENTION

The invention concerns a device for rendering operational a hydraulic actuation device, in particular for a clutch of a motor vehicle.

BACKGROUND OF THE INVENTION

Such devices are routinely used when the wear of clutch components, especially that of the clutch friction lining, leads to changes in the system which, however, should have no influence on the actuation behavior of the clutch.

For example, it is known from DE 199 53 093 A1 to integrate an emitter-receiver system into the clutch actuation, which consists essentially of an emitter piston, a receiver piston and a cylinder that contains the emitter and receiver pistons, in which the emitter and receiver pistons can move axially relative to one another.

By virtue of this relative displacement of the emitter and receiver pistons and the consequent volume adaptation as a function of the wear condition of the clutch components, a largely consistent response behavior of the clutch can be achieved over a longer period of operation. However, the document gives no indication as to a method for the efficient filling of the emitter-receiver system of the clutch actuator.

SUMMARY OF THE INVENTION

The aim of the present invention is to further develop a hydraulic actuating device in such manner that it can be rendered operational, in terms of an emitter-receiver system to be filled with fluid, comparatively rapidly and by simple means.

In a device, according to the presently claimed invention, the fluid supply unit comprises at least one impulse valve that serves to release an essentially constant volume flow and is acted upon by an impulse valve control device constructed such that the volume flow released by the fluid supply unit and flowing into the emitter-receiver system does not exceed a limiting volume flow.

The invention offers the advantage that the emitter-receiver system of a hydraulic actuating device can be filled with fluid via robust, inexpensive and functionally reliable impulse valves controlled by an inexpensively constructed control device. By adjustment of the limiting volume flow, various flow behaviors and different emitter-receiver system structures can be taken into account.

In an appropriate embodiment of the invention, the pistons made as the emitter piston and the receiver piston of the emitter-receiver system can move axially relative to one another within a cylinder and, together with the inside wall of the cylinder, define a filling space at the boundary of which is located a filling opening for the fluid coming from the fluid supply unit.

One of the pistons can have at least one opening, preferably an equalization bore, which allows fluid transport into the space between the piston surfaces of the emitter piston and the receiver piston.

In a preferred embodiment of the invention, the impulse valve control device comprises a control element which maintains the volume flow in the area of the filling opening at a level that ensures volume constancy of the filling space.

For this, the filling opening of the filling space can be so positioned that axial displacement of one of the two pistons can close it off and the control element of the impulse valve control device limits the volume flow into the filling space in such a manner that the piston remains in a position in which fluid flows through the filling opening of the filling space.

In another design feature of the invention, the impulse valve control device comprises a data memory in which parameters concerning the flow resistance of at least one impulse valve are stored, these being used in the computation of the maximum permissible volume flow for filling the emitter-receiver system.

It is appropriate for the control device to actuate a pressure adjustment unit that influences the supply pressure delivered by the hydraulic supply, this pressure adjustment unit determining a reference pressure appropriate for filling the space between the emitter and receiver pistons.

Another basic concept of the invention is to process the pressure loss of an impulse valve in the impulse valve control device through which a constant volume flow is passing, as a parameter for a defined pressure drop at the valve concerned. From the pressure adjustment unit the pressure drop at one or more valves can then be taken into account in computing the reference pressure to be provided.

In a further development of the invention, it is also possible for the control device for influencing the volume flow provided by the hydraulic supply to cooperate with a volume flow regulation device, by which a volume flow is determined suitable for filling the emitter-receiver.

It is also within the scope of the invention that the fluid supply unit can have a hydraulic branch in which there is at least one further impulse valve. The pressure potential at the branching point is determined by the number and arrangement of impulse valves, such that depending on the configuration selected, a limiting volume flow to the emitter-receiver system is not exceeded.

In this it is advantageous for the impulse valve control unit to select the type and interconnection mode of the impulse valves concerned for the purpose of establishing a defined flow resistance.

BRIEF DESCRIPTION OF THE DRAWINGS

The invention will now be described, by way of example, with reference to the accompanying drawings in which.

DETAILED DESCRIPTION OF THE INVENTION

Figure 1:
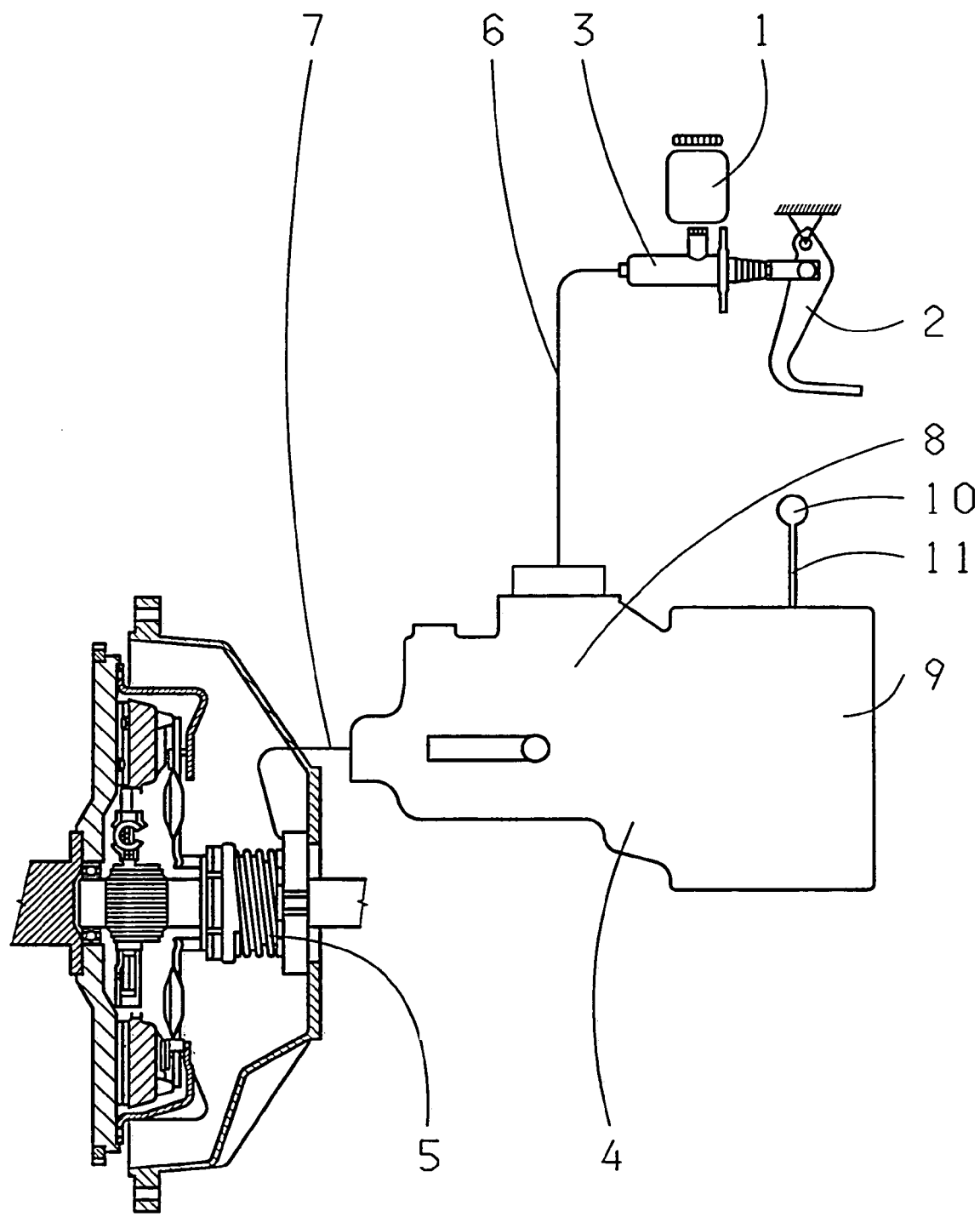
FIG. 1 is a schematic representation of a clutch actuator.

A hydraulic clutch actuator which, according to FIG. 1, can be provided with a pneumatic amplifier, consists essentially of an actuating cylinder 3 provided with an equalization container 1 and actuated by a clutch pedal 2, a pressure amplifier 4 connected downstream from the actuating cylinder 3, a release cylinder 5 formed as an emitter-receiver system which acts upon the clutch release mechanism, and hydraulic lines 6 and 7 which form a fluid-tight connection between the actuating cylinder 3 and the pressure amplifier 4 and between the pressure amplifier 4 and the release cylinder 5.

The pressure amplifier 4 has a pneumatic section 9 that acts on a hydraulic section 8 and the adjacent hydraulic lines 6, 7 which, in the active condition, is acted upon by compressed gas supplied by a compressor 10 via a pneumatic line 11.

Figure 2:
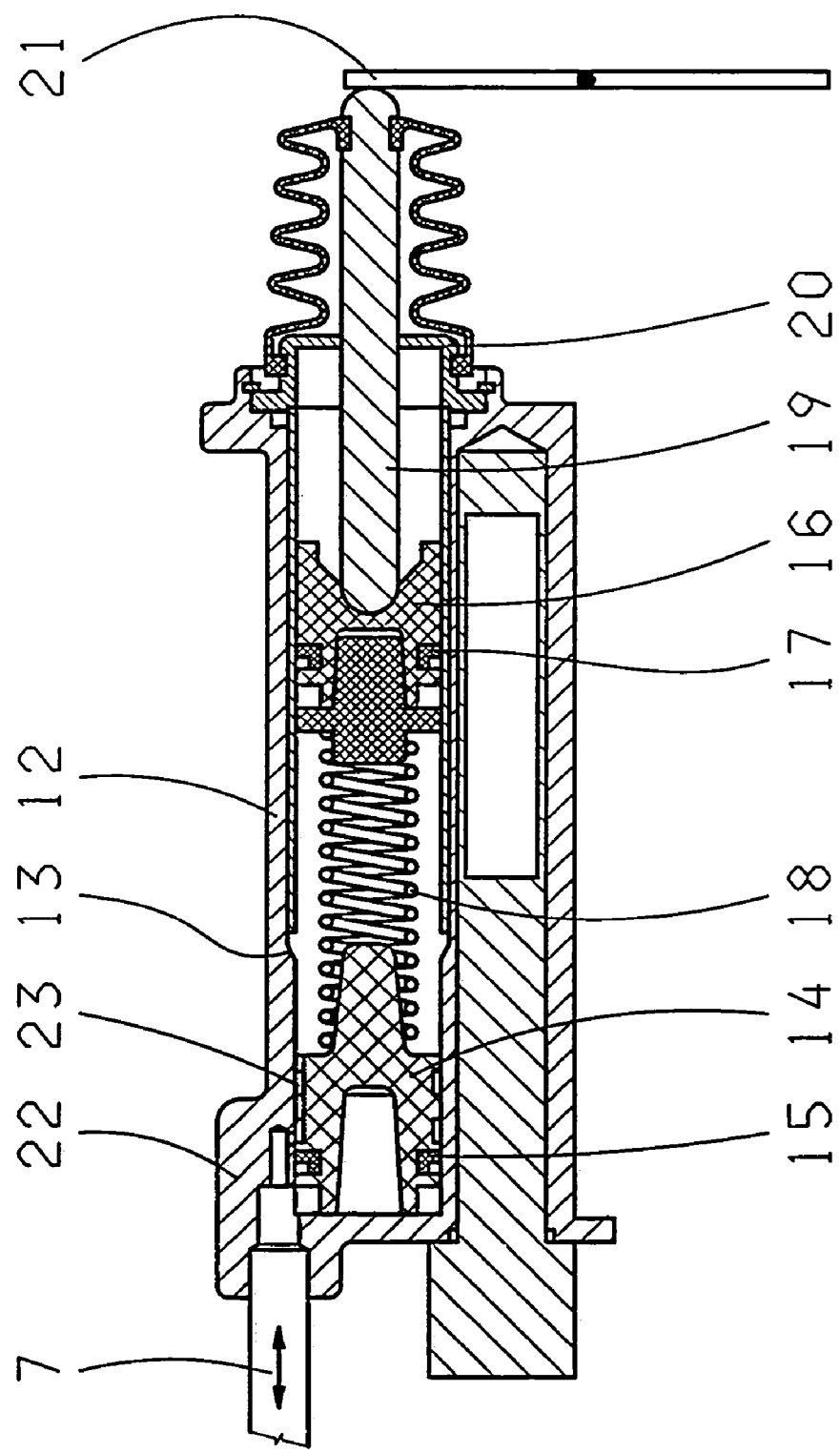
FIG. 2 shows a release cylinder of a clutch actuator, according to FIG. 1, with emitter and receiver pistons.

The release cylinder 5 whose design structure is represented as an example in this case, is shown in FIG. 2 in the non-actuated condition. An essentially cylindrically shaped housing 12 is provided with a stepped bore 13 within which an emitter piston 14 with a sealing ring 15 and a receiver piston 16 with a sealing ring 17 are arranged and able to move. A separation between the emitter piston 14 and the receiver piston 16, and thereby the design possibility of creating a free space for the automatic wear compensation of the clutch components, is produced by a spiral spring 18, which limits the approach of the receiver piston 16 to the emitter piston 14 when the pressure on the emitter piston 14 is eased.

The receiver piston 16 acts upon a piston rod 19, which is guided through an aperture in an end-plate 20 and extends as far as a release lever 21 of the clutch actuator. To protect the piston rod 19, it is surrounded by a bellows which, at its end with larger diameter, is fitted onto the end-plate 20 of the housing 12.

Figure 3:
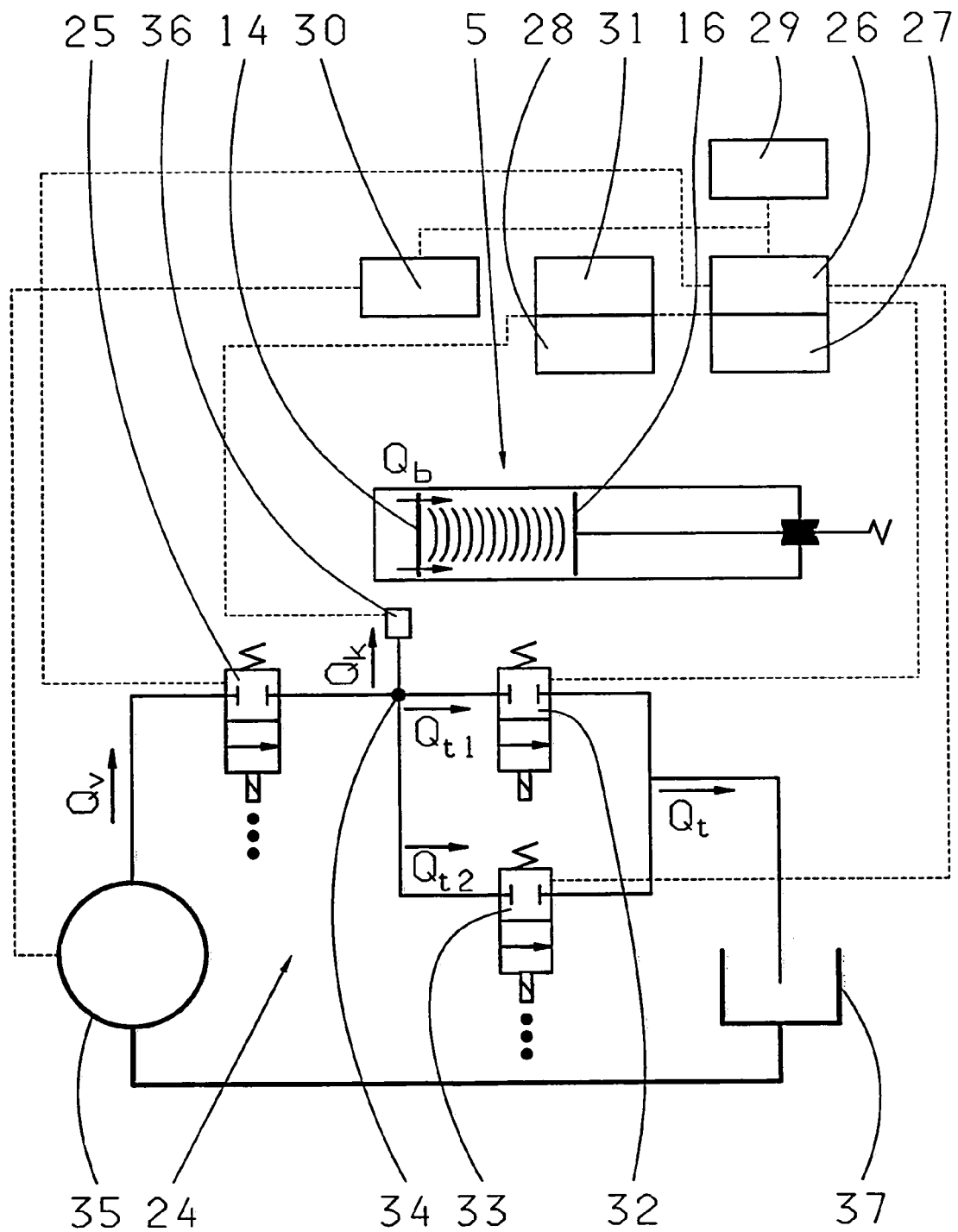
FIG. 3 is an arrangement for filling an emitter-receiver system of a clutch actuator according to FIG. 2.

At the end of the housing 12 away from the piston rod 19, the hydraulic line 7 is in fluid-tight connection with a connection section 22 of the housing 12. An equalization bore 23 provided in the connection section 22 provides a connection, when the end of the emitter piston 14 is acted upon, between the hydraulic line 7 and the space between the emitter piston 14 and the receiver piston 16, so that fluid from a fluid supply unit 24, shown in FIG. 3, can flow via the hydraulic line 7 into the space with a volume flow $Q_K$.

The fluid supply unit 24 comprises a pressure fluid pump 35, which feeds a supply valve 25 with a supply volume flow $Q_V$. This supply valve 25 is made as an impulse valve and, when open, provides an essentially constant volume flow $Q_K$ to feed the equalization bore 23. To control the supply valve 25 in relation to its opening or closing, the valve is connected to an impulse valve control device 26 by a control line, represented in the Figure as a broken line.

The impulse valve control device 26 comprises a control element 27 which acts upon a volume flow limiting device 28 in such manner that during the filling of the space enclosed between the emitter and receiver pistons 14 and 16, the emitter piston 14 does not leave its initial position and the fluid can flow unimpeded through the equalization bore 23 and into the space. At the end of the filling process, the supply valve 25 is closed.

To measure the volume flow, in a further development of the invention, a suitable sensor 36 can be positioned in the supply line 7, this being connected with the control unit via a sensor line represented as a broken line.

In addition, a data memory 29 can be connected to the impulse valve control device 26, in which the preferably high flow resistance of the supply valve 25 is recorded, and a pressure adjustment unit 30 is made available so that the flow resistance of the supply valve 25 is used as a control parameter for the supply volume flow $Q_V$ to be delivered through the pump 35. To control the pump, it is connected to the pressure adjustment unit 30 via a control line represented as a broken line.

Furthermore, the control element 27 is connected to a volume flow regulation device 31 the help of which maintains a suitable fluid throughput to the supply line 7. For this, in accordance with flow-technological practice, equalization impulse valves 32, 33 are arranged after the supply valve 25 and downstream from a line branching point 34, which, when open, allow the fluid that has passed through the supply valve 25 to flow away towards a collection tank 37.

By an appropriate choice of the flow resistances of the supply valve 25 and the equalization valves 32, 33, as a function of the supply pressure from the pressure source and of the opening condition of the two equalization valves 32, 33 a pressure potential can be produced at the branching point 34 that results in a fluid volume flow which enables efficient filling of the space between the emitter piston 14 and the receiver piston 16.

REFERENCE NUMERALS 1 equalization container
2 clutch pedal
3 actuating cylinder
4 pressure amplifier
5 release cylinder
6 hydraulic line
7 hydraulic line
8 hydraulic section
9 pneumatic section
10 compressor
11 pneumatic line
12 housing
13 stepped bore
14 emitter piston
15 sealing ring
16 receiver piston
17 sealing ring
18 spiral spring
19 piston rod
20 end-plate
21 release lever
22 connection section
23 equalization bore
24 fluid supply unit
25 supply valve
26 impulse valve control device
27 control element
28 volume flow limiting device
29 data memory
30 pressure adjustment unit
31 volume flow regulator device
32 equalization valve
33 equalization valve
34 line branching point
35 fluid pump
36 sensor
37 tank

The invention claimed is:

1. A system for rendering a hydraulic actuating device operational, with an emitter-receiver system (5) located in a hydraulic transmission path of the actuating device which comprises emitter and receiver pistons (14, 16) whose positions, relative to one another, can vary as a function of a desired operating behavior of the hydraulic actuating device, the emitter piston (14) and the receiver piston (16) being located in a cylinder so that the emitter add the receiver pistons can move axially relative to one another and, together with an inside wall of said cylinder, define a filling space at a boundary of which is positioned a filling opening (23) for a fluid such that a volume constancy is ensured, with a hydraulic supply and with a fluid supply unit (24) to the emitter-receiver system (5), which comprises at least one valve (25) serving to deliver an essentially constant volume flow, which is acted upon by a control device (26) such that the volume flow released by the fluid supply unit (24), of fluid flowing into the emitter-receiver system (5), does not exceed a limiting volume flow ($Q_K$), wherein the at least one valve (25) is controlled by impulses from the impulse control device (26) l and a hydraulic line branch (34) is in the fluid supply unit (24) to which at least one further equalization impulse valve (32, 33) is connected downstream from the line branch (34) to allow a flow of the fluid from the at least one valve (25) to a collection tank (37) to regulate a pressure at the line branch (24) for filling of the filling space.

2. The system according to claim 1, wherein the impulse valve control device (26) comprises a control element (27) which maintains the volume flow in the area of the filling opening (23) at a flow level which ensures an essentially constant volume of the filling space.

3. The system according to claim 1, wherein in relation to a type and an interconnection of the impulse valves (25, 32, 33), the impulse valve control device (26) makes a selection that results in a defined flow resistance, which does not exceed a limiting flow volume ($Q_K$) directed towards the filling opening (23) of the filling space.

4. The system according to claim 1, wherein the impulse valve control device (26) comprises a data memory (29) in which flow resistance parameters of the at least one impulse valve (25) are or will be stored, and the flow resistance parameters are taken into account when computing a maximum permissible volume flow for filling the emitter-receiver system (5).

5. A system for rendering a hydraulic actuating device operational, the system including an emitter-receiver system (5) located in a hydraulic transmission path of the hydraulic actuating device and comprising a cylinder accommodating an emitter piston (14) and a receiver piston (16), a position of the emitter piston (14) relative to a position of the receiver piston (16) can vary as a function of a desired operating behavior of the hydraulic actuating device, the emitter piston (14) and the receiver piston (16) both being axially movable relative to one another and, together with an inwardly facing wall of the cylinder, defining a filling space communicating with a filling opening (23) for supplying hydraulic fluid from a fluid supply unit (24) to the emitter-receiver system (5) at a desired volume flow:

the fluid supply unit (24) including at least one impulse valve (25) for delivering an essentially constant volume flow and a control device (26) for controlling the essentially constant volume flow, supplied by the fluid supply unit (24) to the emitter-receiver system (5), so that the essentially constant volume flow does not exceed a limiting volume flow ($Q_k$):

wherein the at least one impulse valve (25) is controlled by impulses from the control device (26) and the fluid supply unit (24) has at least one additional impulse valve (32 or 33) connected thereto by a hydraulic line branch (34); and a control element (27), for influencing a supply pressure delivered by a hydraulic supply, actuates a pressure adjustment unit (30) by which a reference pressure, suitable for filling the filling space located between the emitter piston (14) and the receiver piston (16), is established.

6. A system for rendering a hydraulic actuating device operational, the system including an emitter-receiver system (5) located in a hydraulic transmission path of the hydraulic actuating device and comprising a cylinder accommodating an emitter piston (14) and a receiver piston (16), a position of the emitter piston (14) relative to a position of the receiver piston (16) can vary as a function of a desired operating behavior of the hydraulic actuating device, the emitter piston (14) and the receiver piston (16) both being axially movable relative to one another and, together with an inwardly facing wall of the cylinder, defining a filling space communicating with a filling opening (23) for supplying hydraulic fluid from a fluid supply unit (24) to the emitter-receiver system (5) at a desired volume flow:

the fluid supply unit (24) including at least one impulse valve (25) for delivering an essentially constant volume flow and a control device (26) for controlling the essentially constant volume flow, supplied by the fluid supply unit (24) to the emitter-receiver system (5), so that the essentially constant volume flow does not exceed a limiting volume flow ($Q_k$):

wherein the at least one impulse valve (25) is controlled by impulses from the control device (26) and the fluid supply unit (24) has at least one additional impulse valve (32 or 33) connected thereto by a hydraulic line branch (34); and a pressure loss of the at least one impulse valve (25) through which the essentially constant volume flow is passing, is processed by the valve control device (26) as a parameter for a defined pressure drop at the valve.

* * * * *